United States Patent [19]

Kobayashi et al.

[11] Patent Number: 5,221,896
[45] Date of Patent: Jun. 22, 1993

[54] POSITION SENSOR ARRANGEMENT FOR DETECTING A SIGNAL AFTER A TIME DELAY FROM THE ZERO CROSSING OF THE AC POWER SOURCE

[75] Inventors: Noboru Kobayashi; Sunao Sugimoto, both of Kobe, Japan

[73] Assignee: Kawasaki Jukogyo Kabushiki Kaisha, Kobe, Japan

[21] Appl. No.: 832,701

[22] Filed: Feb. 7, 1992

[30] Foreign Application Priority Data

Feb. 18, 1991 [JP] Japan .................. 3-023529

[51] Int. Cl.$^5$ .............................................. G01B 7/14
[52] U.S. Cl. ......................... 324/207.17; 324/207.13; 324/207.22; 324/207.26
[58] Field of Search ..................... 324/207.13, 207.17, 324/207.22, 207.24, 207.26, 207.12, 207.16, 207.15, 225, 233, 239

[56] References Cited

U.S. PATENT DOCUMENTS

| 4,401,987 | 8/1983 | Trenkler et al. | 324/207.17 |
| 4,816,759 | 3/1989 | Ames et al. | 324/207.17 |
| 4,985,691 | 1/1991 | Pulyer et al. | 336/130 |

FOREIGN PATENT DOCUMENTS

| 0158593 | 10/1985 | European Pat. Off. |
| 0172998 | 3/1986 | European Pat. Off. |
| 0393683 | 10/1990 | European Pat. Off. |

OTHER PUBLICATIONS

Hamamatsu Technical Data for PDS Series Jul. 1989.

Primary Examiner—Walter E. Snow
Attorney, Agent, or Firm—Leydig, Voit & Mayer

[57] ABSTRACT

In order to supply water into a water tank mounted on a train, a position detecting apparatus and method is developed for assisting connection of the tube coupler of the water tank with the tube coupler attached to the working terminal of a robot placed on the ground. Either one of the train and the working terminal of the robot is provided with a target circuit composed of a target coil and a capacitor connected in parallel while the other is provided with an excitation circuit, a sensor coil and a detector. The excitation circuit is provided with a power coil driven by an AC power source for generating magnetic field to induce current in a target coil. The magnetic flux center line of the sensor coil is orthogonal to that of the power coil so that the sensor coil does not sense the magnetic field generated by the power coil but senses only the magnetic field generated by the target coil. The output level of the sensor coil corresponds to the relative positions of the target coil and the sensor coil. The detector detects the output level of the sensor coil having a predetermined phase difference from the output of the AC power source. Thus, the position detection can be carried out under poor environment, and also the arrangement can be simplified since the target circuit requires no power source.

6 Claims, 14 Drawing Sheets

FIG. 10
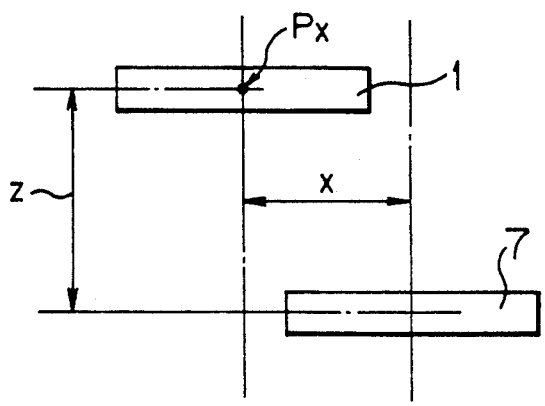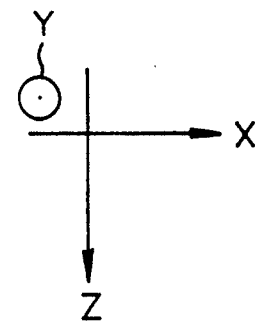
FIG. 11
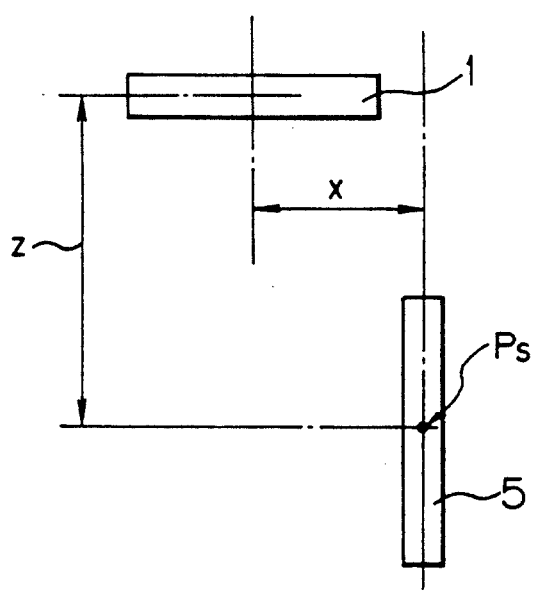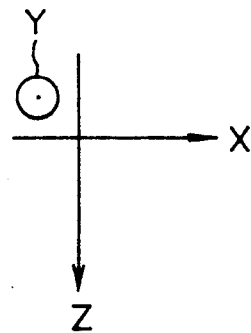

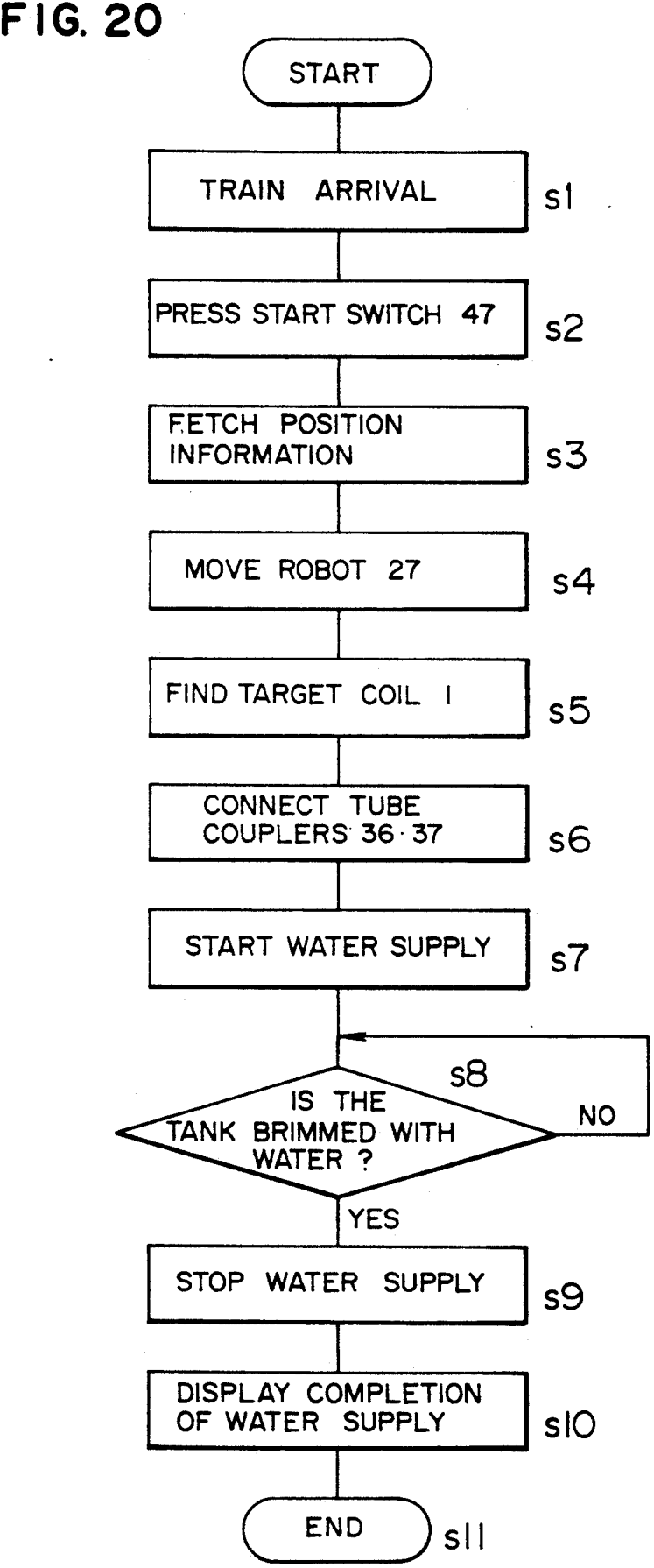

POSITION SENSOR ARRANGEMENT FOR DETECTING A SIGNAL AFTER A TIME DELAY FROM THE ZERO CROSSING OF THE AC POWER SOURCE

BACKGROUND OF THE INVENTION

1. Field of the Invention

The present invention relates to a position detecting apparatus and method which are preferably used in e.g. a robot to position an object.

2. Description of the Related Art

In order to automatically supply water from the ground to a water tank mounted on a train, the following technique has been proposed. A robot is movably set in the neighborhood of a prescribed train stopping position, and a tube coupler for water supply attached to the working terminal of this robot is automatically connected with the tube coupler of the water tank mounted on the train to supply water to the water tank. An example of a position detecting method performing such a technique is as follows. Either one of the working terminals of the train and the robot is provided with a spot light source for emitting light therefrom. The other is provided with a semiconductor PSD (position sensing device), as available from Hamamatsu Photonics Limited at Hamamatsu city in Shizuoka, Japan, having a planar light receiving surface for detecting the two-dimensional position of the light emitted from the spot light source. Thus, the two tube couplers can be connected in a state that they are precisely positioned in a relationship from each other. However, this method has the following defects.

(1) Since the position is detected optically, detection error or detection impossibility may occur in poor environment.

(2) Power sources are required for both the light spot and the position detecting device. This is very disadvantageous since fewer power sources are preferable.

SUMMARY OF THE INVENTION

An object of the present invention is to provide a position detecting apparatus with improved resistance to environment and a simplified structure with fewer power sources, and a position detecting method using this apparatus.

In order to attain the above object, in accordance with one aspect of the present invention, there is provided a position detecting apparatus comprising a target circuit composed of a target coil and an impedance device connected with each other, an excitation circuit composed of a power coil shiftable in a relative position relationship with the target coil and an AC power source for driving the power coil connected with one another, a sensor coil integrated with the power coil so that the magnetic flux center line of the power coil is orthogonal to that of the sensor coil, and means for detecting the level of the output of the sensor coil having a predetermined phase difference from an AC power source.

The position detecting apparatus may be characterized in that the impedance element is a capacitor and the resonance frequency of the target circuit is equal to that of output frequency of the AC power source.

The position detecting apparatus according to the present invention may also be characterized in that a pair of sensor coils the magnetic flux center lines of which are orthogonal to each other are provided, and the sensor means are provided respectively for each sensor coil.

The position detecting apparatus according to the present invention may be characterized in that the output level of the sensor coil having a predetermined phase difference from the output of the AC power source is detected within a range where maximum values with opposite polarities are obtained.

In accordance with another aspect of the present invention, there is provided a position detecting method for detecting a relative position relationship between a first object and a second object using a position detecting apparatus comprising a target circuit attached to the first object and composed of a target coil and an impedance element connected with each other, an excitation circuit attached to the second object and composed of a target coil and a power coil shiftable in a relative position relationship with the target coil and an AC power source for driving the power coil connected with one another, a sensor coil integrated with the power coil so that the excitation center line of the power coil is orthogonal to that of the sensor coil, and means for detecting the level of the output of the sensor coil having a predetermined phase difference from an AC power source within a range where its maximum levels with opposite polarities can be obtained, the method comprising the steps of shifting said first object and said second object so that they are located in said range, and shifting said first and second object so that the output level of the sensor coil having the predetermined phase difference from the output of the AC power source becomes zero on the basis of the output from the detecting means.

In accordance with the present invention, in order to detect relative positions of a first and a second object, a target circuit is attached to the first object, an excitation coil, and a sensor coil and detecting means are attached to the second object. The target coil of the target circuit is excited by the magnetic field from the power coil driven by the AC power source for the excitation coil. The target coil is connected with the impedance element such as a capacitor or a resistor so that the target circuit may resonate at the same frequency as the output frequency of the AC power source. The magnetic field generated by the target coil due to crossing of its magnetic flux from the power coil is detected by the sensor coil. The detecting means detects the output level from the sensor coil having a prescribed phase difference from the output of the AC power source for driving the power coil. Thus, the relative position relationship between the sensor coil and the target coil corresponding to the output level of the sensor coil can be detected.

Since the magnetic flux center line of the power coil is orthogonal to that of the sensor coil, it is possible to prevent the sensor coil from being affected by the magnetic field of the power coil. Also, since the target circuit requires no power source, the structure of the position detecting apparatus can be simplified. Further, since the position detection is carried out using the magnetic couplings between the power coil and the target coil and between the target coil and the sensor coil, the position detecting apparatus has a more excellent resistance to poor environment than the optical construction according to the prior art described above. When a pair of sensor coils are used, the position of the target coil can be detected two-dimensionally.

Further, in the present invention, the output level of the sensor coil having the prescribed phase difference from the output of the AC power source varies linearly for the change in the position relationship between the target coil and the sensor coil within a range where its maximum values with opposite polarities are obtained, so that the position detection can be made precisely.

In accordance with the position detection method according to the present invention, at first, the first object and said second object are shifted so that the level of the output of the sensor coil having a predetermined phase difference from an AC power source is located within a range between the maximum levels with opposite polarities, and then, these objects are shifted so that the output level of the sensor coil becomes zero on the basis of the output from the detecting means. Thus, the target coil and the sensor coil are positioned so that the first and the second object can be positioned precisely.

BRIEF DESCRIPTION OF THE DRAWINGS

FIG. 10 is a plan view showing the positions of the target coil 1 and the power coil 7 projected on the X - Z plane with the coordinate axes;

FIG. 11 is a plan view showing the positions of the target coil 1 and the sensor coil 5 projected onto the X - Z plane with the coordinate axes;

FIG. 20 is a flowchart showing the operation of the construction of FIG. 19.

DESCRIPTION OF THE PREFERRED EMBODIMENTS

Figure 1:
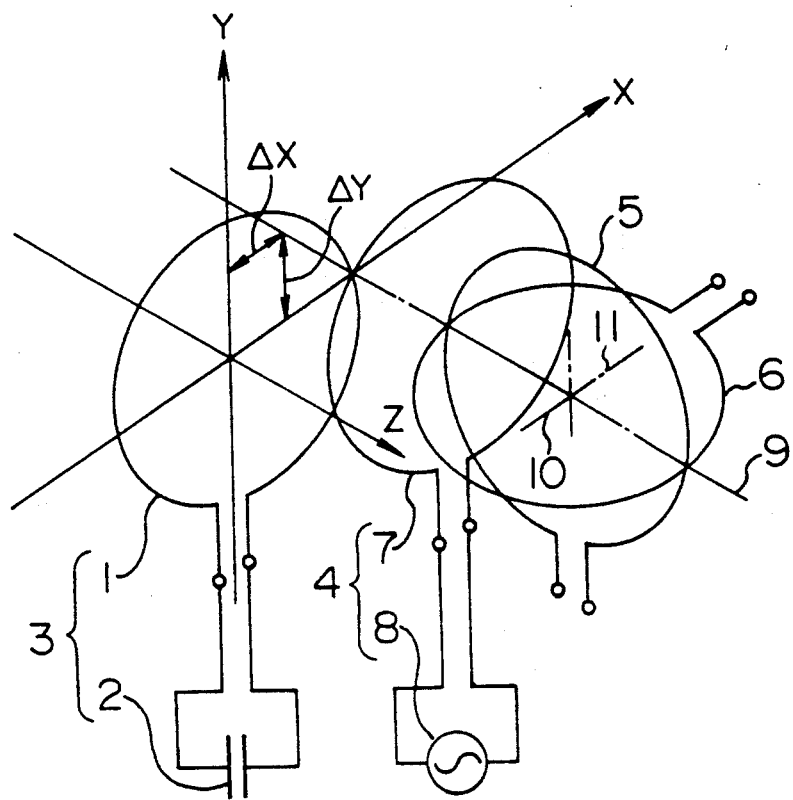
FIG. 1 is a perspective view of explaining the principle of the position detecting apparatus according to the present invention.
Figure 15:
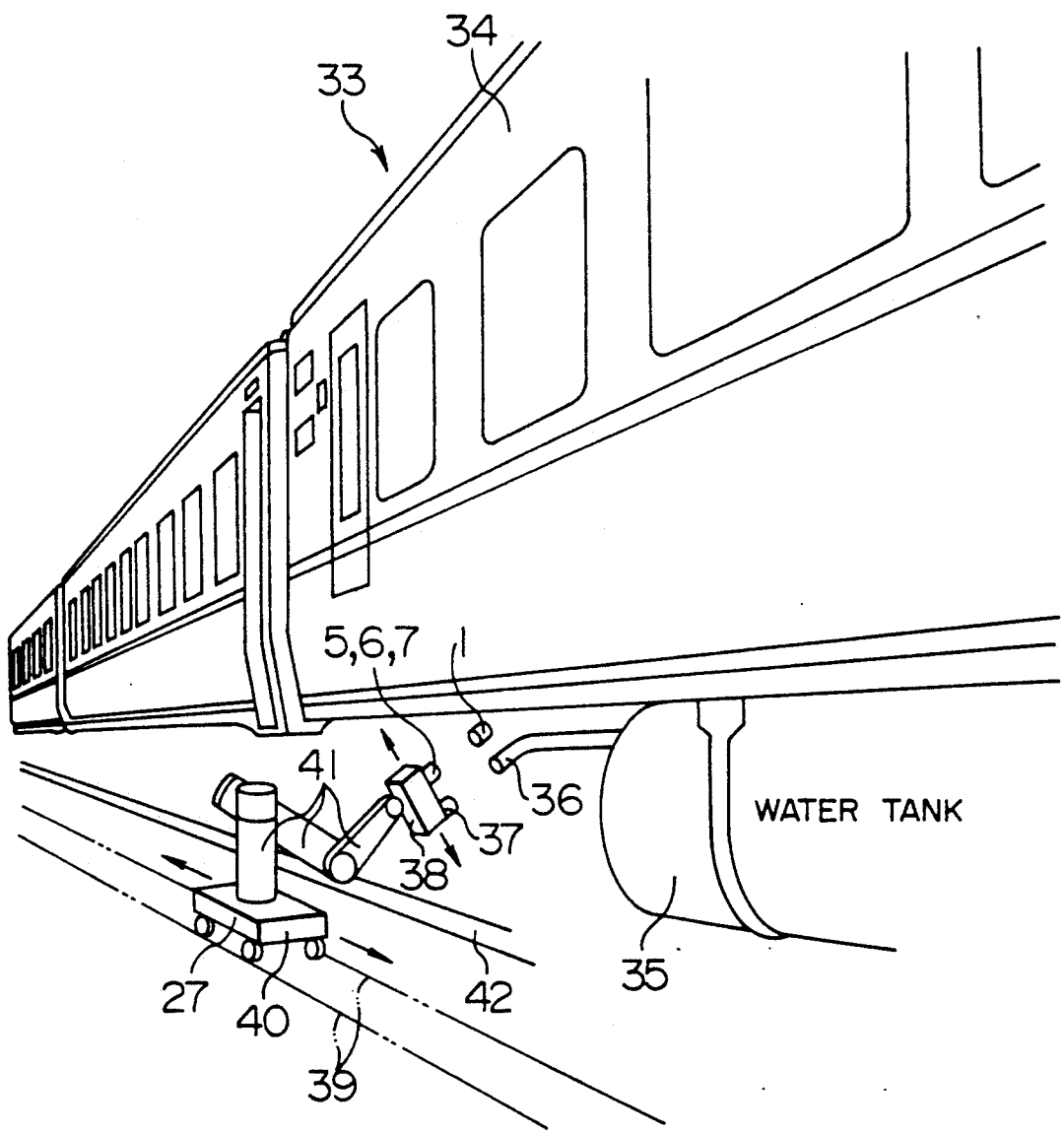
FIG. 15 is a perspective view of one embodiment of the present invention relative to a water supply robot 27.

FIG. 1 is a simplified perspective view showing the principle of the position detecting apparatus according to the present invention. The first object e.g. a vehicle 34 as shown in FIG. 15, whose two-dimensional position is to be detected, is provided with a target circuit 3 composed of a target coil 1 and a capacitor 2 (impedance element) connected in parallel with each other. The working terminal 38 of a second object, e.g. a robot 27 as shown in FIG. 15 is provided with an excitation coil 4 and a pair of sensor coils 5 and 6. It should be noted in FIG. 1 that the target coil 1 has a coil strand wound in a circular shape in an X - Y plane, and its magnetic flux center line is coincident with a Z-axis.

In operation, the excitation circuit 4 generates an induction current in the target coil 1. The change in the magnetic field due to this induction current is sensed or detected by the pair of sensor coils 5 and 6. The relative positions of the first and the second object are sensed on the basis of the outputs from the sensor coils 5 and 6.

The excitation coil 4 is composed of a power coil 7 and an AC power source 8 for driving the power coil which are connected with each other. The target circuit may be considered an inductance modifying mechanish. The output frequency of the AC power source 8 may be e.g. 30 kHz. The power coil 7 has a coil strand wound in a circle, and its magnetic flux center line is a straight line 9. The sensor coils 5 and 6 along the X-axis and the Y-axis respectively are arranged integrally with the power coil 7. The sensor coils 5 and 6 have coil strands wound in a circle in a plane orthogonal to each other. The line 9 is a line perpendicular to the X - Y plane. The magnetic flux center line of the sensor coil 5 is a straight line in parallel to the X-axis, and that of the sensor coil 6 is a straight line in parallel to the Y-axis. The sensor coils 5 and 6 have substantially the same structure. In a state where the line 9 is perpendicular to the X - Y plane and so in parallel to the Z-axis, the shift amount $\Delta X$ in the X-direction can be sensed or detected on the basis of the output from the sensor coil 5 as described thereafter, and the shift amount $\Delta Y$ are connected on the basis of the sensor coil 6.

Figure 2:
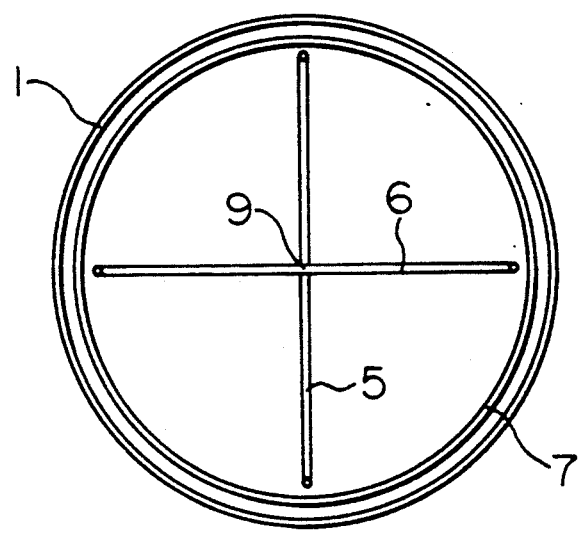
FIG. 2 is a front view of projection of a target coil 1, sensor coils 5 and 6, and a power coil 7 onto the X - Y plane.

FIG. 2 is a simplified front view showing the state where the line 9 is coincident with the Z-axis. All the radiuses of the target coil 1, the sensor coils 5 and 6 and the power coil 7 may be equal. Since the magnetic flux center line 9 of the power coil 7 is orthogonal to the magnetic flux center line 10 of the sensor coil 5, the sensor coil 5 does not sense the magnetic field generated by the power coil 7. Likewise, since the line 9 is orthogonal to the magnetic flux center line 11 of the sensor coil 6, the sensor coil 6 does not sense the magnetic field generated by the power coil 7.

Figure 3:
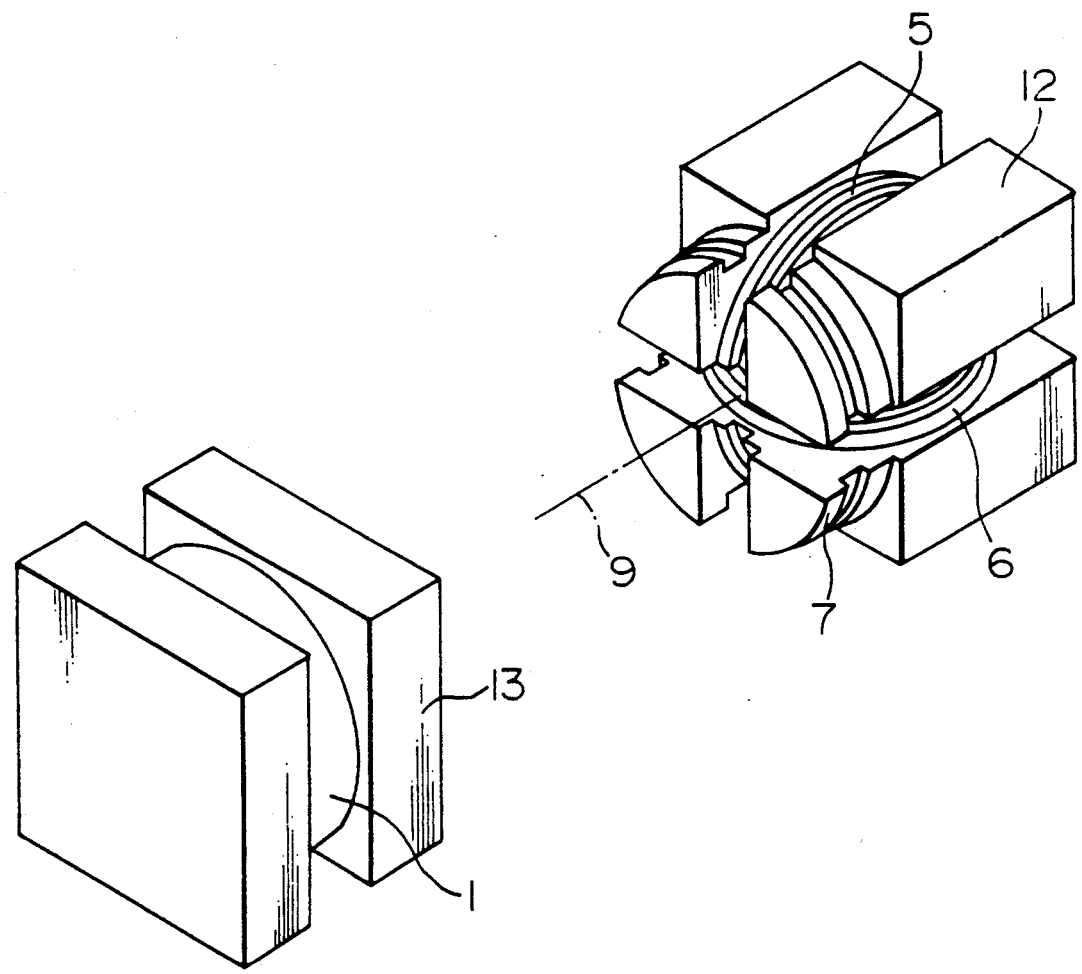
FIG. 3 is a perspective view of the concrete structures of the target coil 1, the sensor coils 5 and 6, and the power coil 7.

FIG. 3 is a perspective view showing a part of the arrangement of the position detecting apparatus shown in FIG. 1. As seen from FIG. 3, the pair of sensor coils 5 and 6, and the power coil 7 are wound on a bobbin 12. This bobbin 12 is made of a non-magnetic material such as synthetic resin. On the other hand, the target coil 1 is wound on a bobbin 13 made of a non-magnetic material.

Figure 4:
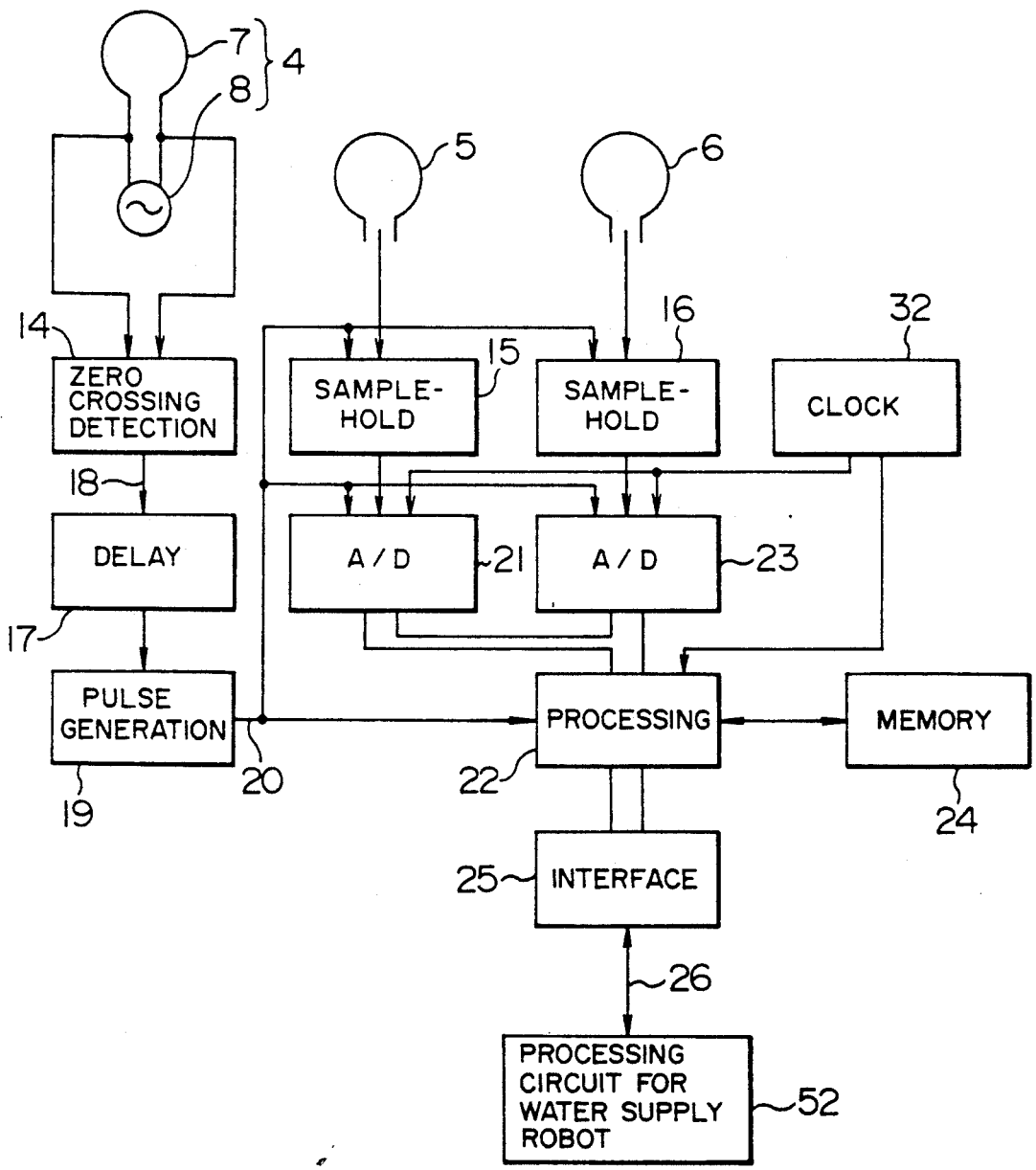
FIG. 4 is a block diagram of the electrical construction according to one embodiment of the present invention.

FIG. 4 is a block diagram showing the electrical arrangement relative to the sensor coils 5 and 6, and the power coil 7. In operation, the output from the AC power source 8 for driving a power coil 7 is supplied to a zero crossing detecting circuit 14. The output voltage waveform of the AC power source 8 is shown in graph (1) of FIG. 6 and its zero crossing points are indicated by times t1, t2 and t3. The outputs from the sensor coils 5 and 6 are sent to sample-hold circuits 15 and 16.

Figure 5A:
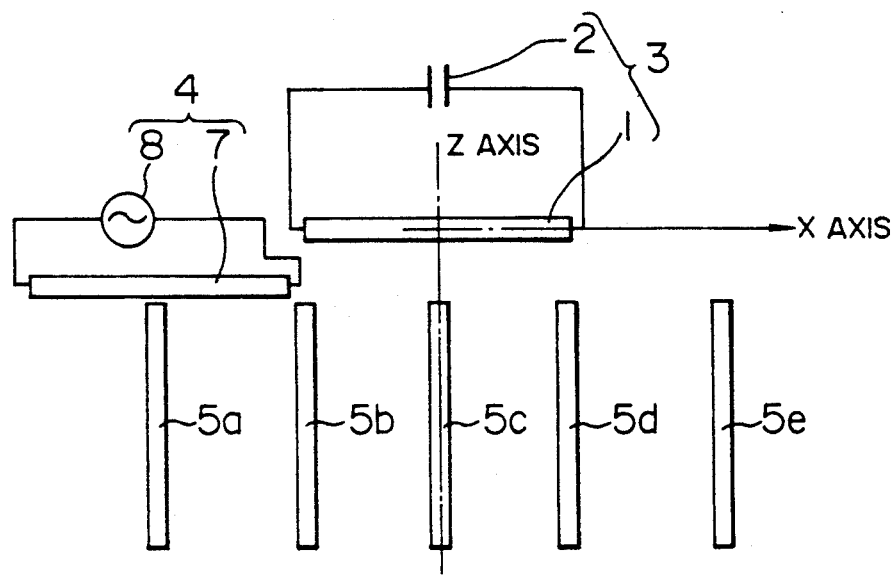
FIG. 5A is a view for explaining the operation relative to the sensor coil 5.

FIG. 5A is a plan view of the target coil 1, power coil 7 and sensor coil 5 viewed from the perpendicular direction of the X - Z plane. The output waveform from the sensor coil 5 varies at positions designated by reference numerals 5a to 5e. The reference numerals 5a to 5e will be also used to specify the sensor coil itself at the respective positions. The sensor coil 5c represents the state where it is located on the Z-axis which is the magnetic flux center line of the target coil 1. The power coil 7 is shown only when the sensor coil 5 is located at the position 5a.

Figure 6:
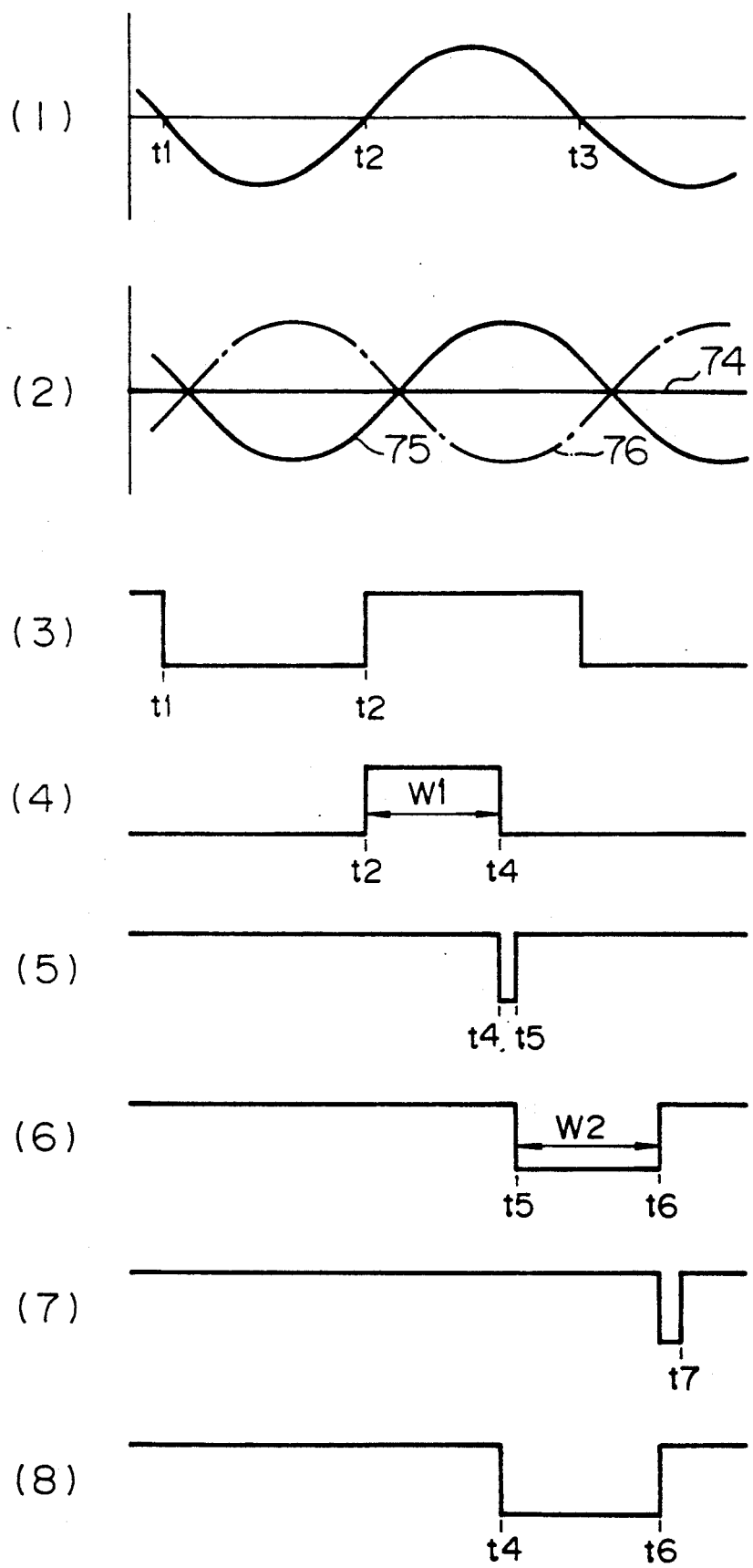
FIG. 6 is a waveform chart for explaining the operation of the electric construction of FIG. 4.

When the sensor coil 5 is at the positions 5a and 5d, it produces the waveform indicated by 75 in graph (2) of FIG. 6. When the sensor coil 5 is at the positions 5b and 5e, it produces the waveform indicated by 76 in the graph (2). On the other hand, when the sensor coil 5 is at the position 5c, the output from the sensor coil 5 is zero indicated by numeral 74 in the graph (2). This is also true in the shift of another sensor coil 6 in the Y-direction.

The zero crossing detecting circuit 14 supplies a zero-crossing signal as shown in graph (3) of FIG. 6 to a delay circuit 17 through a line 18. The delay circuit 17 delays the rising edge of the zero crossing signal received through the line 18 by a period W1 and provides a signal shown in graph (4) of FIG. 6 to the pulse generating circuit 19. The pulse generating circuit 19 provides a pulse shown in graph (5) of FIG. 6 to a line 20 with a pulse width of e.g. 200 ns or longer starting from time t4 elapsed from time t2 by the period W1, so as to supply top sample-hold circuits 15 and 16 as a command. The sample-hold circuit 15 holds the output from the sensor coil 5 after the time t4 as shown in graph (8) of FIG. 6. In response to the pulse passing through the line 20, an A/D converter 21 converts the output held by the sample-hold circuit 13 into a digital value during a period W2 (e.g. shorter than 9 μ sec) starting from time t5. The output from the A/D converter 21 is supplied to a processing circuit 22 (which may be realized by a microcomputer) during the period from time t6 to time t7. Likewise, the sample-hold circuit 16 is provided for another sensor coil 16. The output from the sample-hold circuit 16 is converted into a digital value by an A/D converter 23. The digital output from the A/D converter 23 is supplied to the processing circuit 22. The processing circuit 22 is connected with a memory 24. The signals representative of the shift amounts ΔX and ΔY calculated by the processing circuit 22 are supplied to a water supply robot processing circuit 52 from a communication interface 25 through a line 26 as described later. A clock signal generating circuit 32 supplies a clock signal to the A/D converters 21 and 23 to control the operation thereof.

Figure 5B:
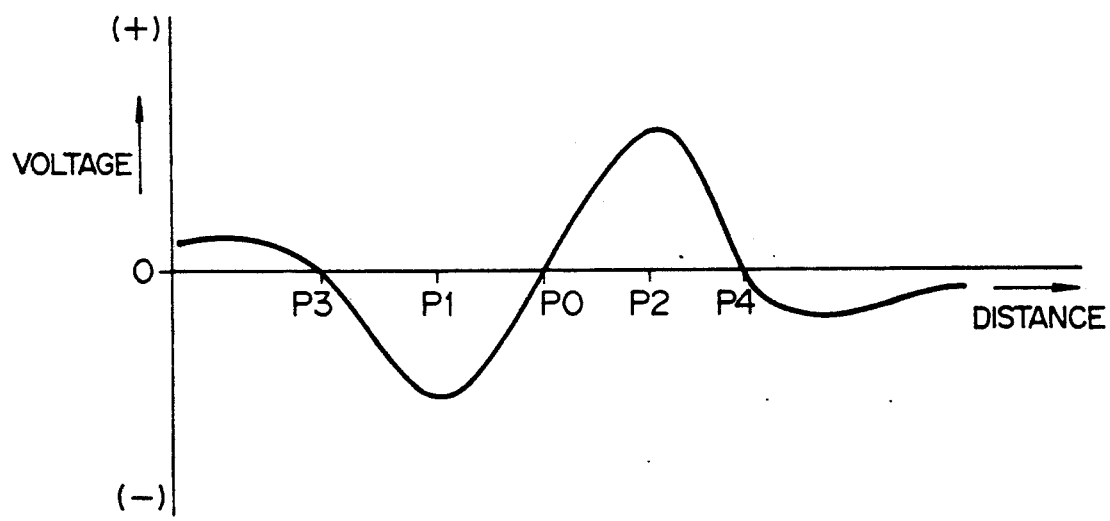
FIG. 5B is a waveform chart of the output voltage of the sensor coil 5 at a predetermined phase difference when the sensor coil 6 shifts in the X-axis direction in FIG. 5A.

FIG. 5B shows the output voltage level of the sensor coil 5 having a fixed phase difference from the output voltage of the AC power source 8 supplied to the power coil 7 when the sensor coil 5 is shifted in the X-direction along the positions 5a to 5e in FIG. 5A. The phase difference is due to the impedance of the sensor coil 5. The output from the sensor coil 5 having the fixed phase difference from the AC power source 8 is desired to be in its maximum value so that the sensitivity can be in maximum, but it is not indispensable. If the sensor coil 5 is on the Z-axis, in FIG. 5B, the output level of the sensor coil 5 is zero as indicated by reference symbol P0. With the Z-direction fixed, the output level changes linearly in the range between the positions P1 and P2 in the X-direction. In such a range from P1 to P2, the position relationship between the target coil 1 and the sensor coil 5 can be precisely detected. Further, in order to adjust the relative position relationship between the target coil 1 and the sensor coil 5, their positions may be detected in a range between P3 and P4. The feedback control can adjust the position relationship between the target coil 1 and the sensor coil 5 on the basis of the sign of the detected signals. Now referring to FIGS. 7 to 12, an explanation will be given of the reason why, when the relative positions of the target coil 1 and the sensor coil 5 change, the output level of the sensor coil 5 having a fixed phase difference from the output of the AC power source 8 changes as shown in FIG. 5B.

Figure 7:
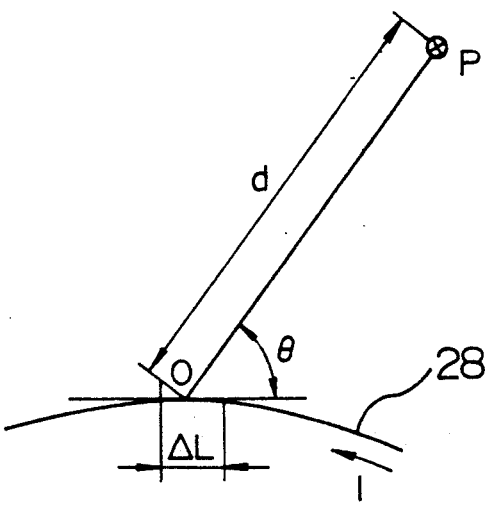
FIG. 7 is a view for explaining Bio Savart's law.

When reference to FIG. 7, according to Bio Savart's Law, the intensity ΔH of the magnetic field at the point P due to the current vector I flowing through a conductive line 28 can be written by $$\Delta H = \frac{I \cdot \Delta L \cdot \sin\theta}{4\pi d^2} \quad (1)$$

Figure 8:
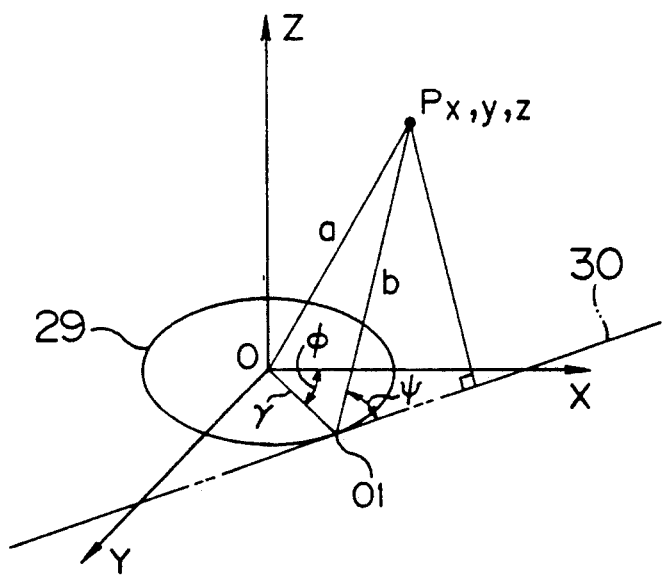
FIG. 8 is a perspective view for explaining the strength of the magnetic field at a point P when a current I flow through a coil 19.
Figure 9:
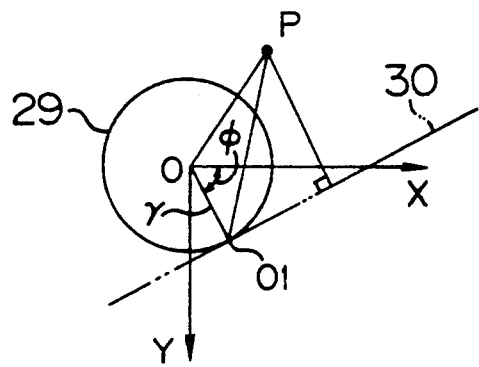
FIG. 9 is a plan view showing the projection on the X - Y plane in FIG. 8.

ΔH represents the minute magnetic field at the point P generated by the current I at a minute portion ΔL of the conductive line apart from the point P by a distance d, and θ represents an angle formed by the minute portion ΔL and a straight line OP. The direction of the magnetic field depends on Ampere's right screw law. Therefore, assuming that as shown in FIG. 8 and FIG. 9 which is a plan view of FIG. 8, the conductive line 29 is a circle laid in the X - Y plane, the intensity H of the magnetic field generated at the point P owing to the current I along the entire conductive line 29 can be expressed by $$H = \int_0^{2\pi} \frac{n \cdot I \cdot r \cdot d\phi \cdot \sin\psi}{4\pi b^2} d\phi \quad (2)$$

$$b = \sqrt{(x - r \cdot \cos\phi)^2 + (y - r \cdot \sin\phi)^2 + z^2} \quad (3)$$

where r is a radius of the conductive line 29 which comes in contact with a tangent line 30 at a contact point O1, a is a distance between the center O of the circle and the point P, b is a distance between the point P and the contact point O1, φ is an angle formed by the radial line connecting the center O with the contact point O1 and the X-axis, and Ψ is an angle formed by the straight line connecting the contact point with the point P and the tangent line 30.

Therefore, in FIG. 10 the intensit $H_{pt}$ of the magnetic field due to the power coil 7 at the center Pt of the target coil 1 can be expressed by $$H_{pt} = \int_0^{2\pi} \frac{n1 \cdot I1 \cdot r1 \cdot d\phi \cdot \sin\psi}{4\pi(b_{pt})^2} d\phi \tag{4}$$

$$b_{pt} = \sqrt{(x - r1 \cdot \cos\phi)^2 + (y - r1 \cdot \sin\phi)^2 + (z_{pt})^2} \tag{5}$$

where n1 is the number of windings of the power coil 7, I1 is the current supplied to the power coil 7, r1 is the radius of the power coil 7 and $z_{pt}$ is the distance from the center Pt of the target coil 1 to the plane of the power coil 7.

Further, in FIG. 11, the intensity $H_{ps}$ of the magnetic field due to the target coil 1 at the center Ps of the sensor coil 5 can be expressed by $$H_{ps} = \int_0^{2\pi} \frac{n2 \cdot H_{pt} \cdot r2 \cdot d\phi \cdot \sin\psi}{4\pi(b_{ts})^2} d\phi \tag{6}$$

$$b_{ps} = \sqrt{(x - r2 \cdot \cos\phi)^2 + (y - r2 \cdot \sin\phi)^2 + (z_{ts})^2} \tag{7}$$

where n2 is the number of windings, r2 the radius of the target coil 1 and $z_{ts}$ is the distance from the center Ps of the sensor coil 5 to the plane of the target coil 1.

Since it is difficult to calculate the current flowing through the target coil 1. Equation (6) can be obtained using the intensity $H_{pt}$ of the magnetic field in Equation (4) corresponding to it.

Figure 12:
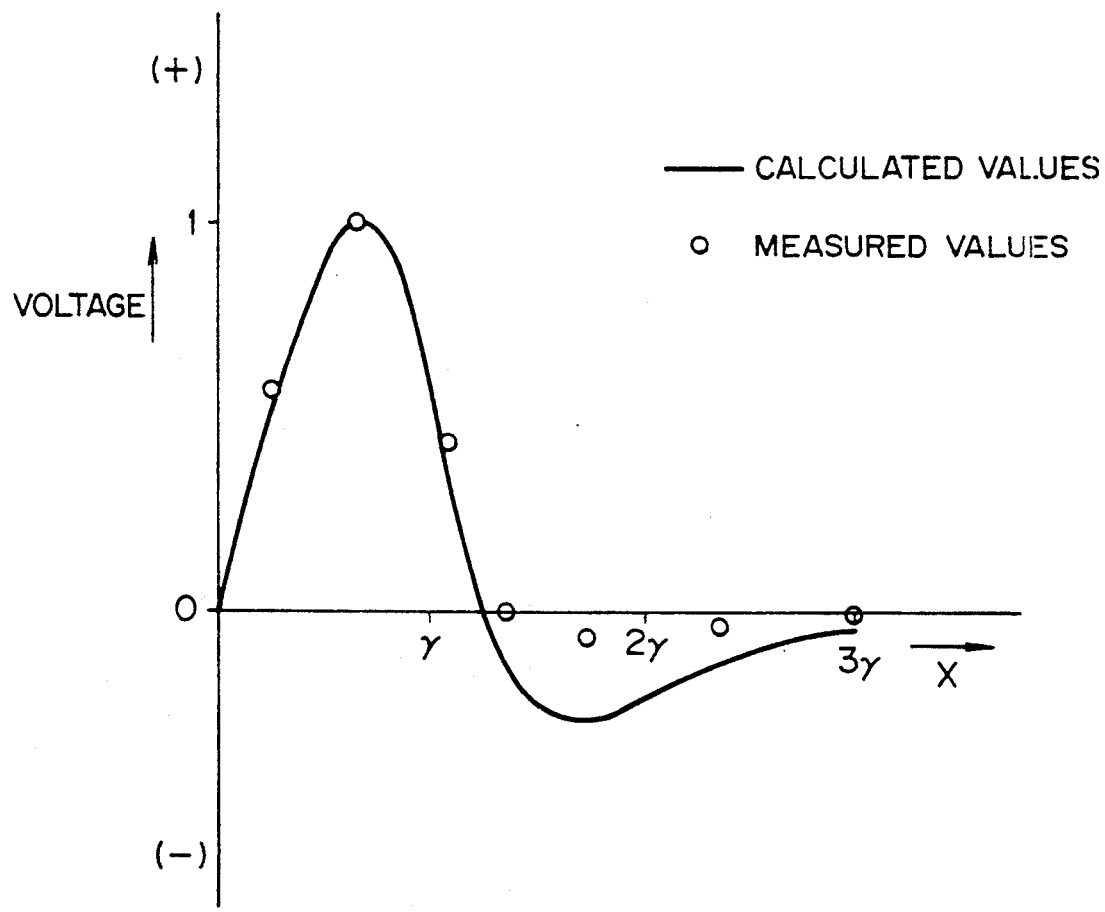
FIG. 12 is a graph showing an example of the experimental result of the output from the target coil in the present invention.

Assuming that y=0 and z=r, $H_{ps}$ is calculated in the range where x lies between 0 and +3r. FIG. 12 is a graph showing the comparison between the calculated values and actually measured values. It is assumed in FIG. 12 that the position relationship of the coils related to the coordinate system corresponds to FIGS. 7 to 11. The actually measured values are expressed by a unit so that the peak voltage generated in the sensor coil 5 is 1, while the calculated values are represented by the profile corresponding to the unit. As seen, the calculated values coincide with the actually measured values to a considerable degree. The graph of FIG. 12 corresponds to the figure located right from the point P0 in FIG. 5B and the figure located left from the point P0 is point-symmetrical to it with respect to the origin point 0. Thus, the characteristic of FIG. 5B is obtained by detecting the output level (e.g. peak value) of the sensor coil 5 having a prescribed phase difference (e.g. 180°) from the output of the AC power source 8 owing to the impedance of the coil. Therefore, if the distance in the Z-direction is known, the shift amount ΔX can be calculated on the basis of the output of the sensor coil 5. Such a characteristic as shown in FIG. 5 is previously stored in the memory 24 in FIG. 4. The processing circuit 22 calculates the shift amount ΔX from the output of the sensor coil 5 on the basis of the characteristic stored in the memory 24. Although the above explanation was made for the sensor coil 5, the shift amount ΔY can be calculated from the output of the sensor coil 6 in the same manner. If ΔX and ΔH are fixed, ΔZ can be calculated in the similar manner.

The technical idea of the present invention will be explained in both cases where (1) the target coil is stationary, and (2) it moves freely.

Figure 13:
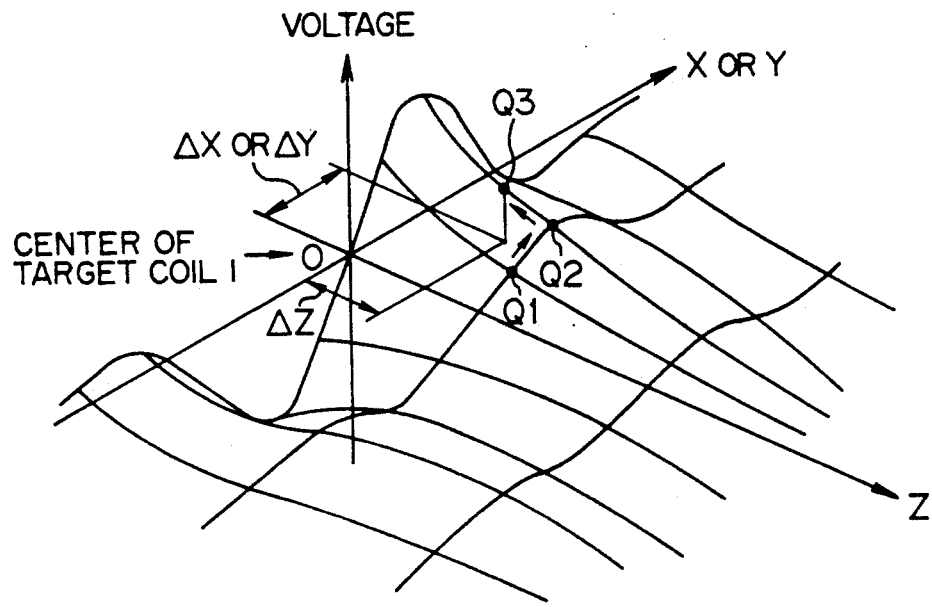
FIG. 13 is a view showing the exemplary contents stored in a memory 24 which are predetermined relating to the target coil 1.
Figure 14:
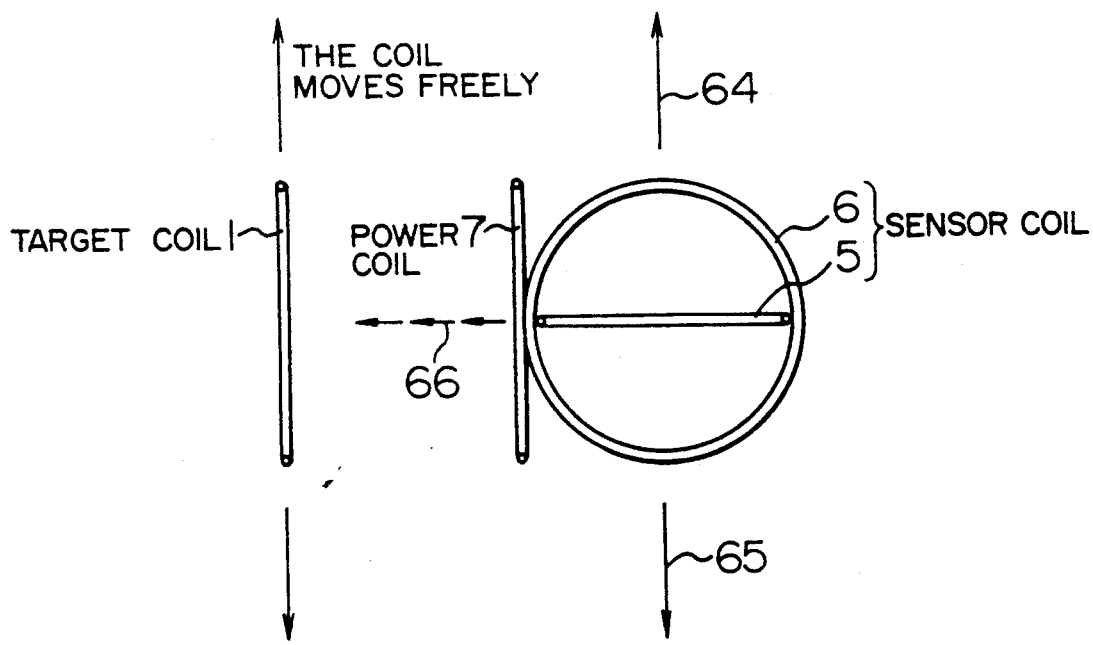
FIG. 14 is a simplified plan view for explaining the operation when the target coil moves freely.

In the case of (1), with the relationship between the voltage from the sensor coil 5 or 6 and the moving distance of the sensor coils previously stored as a table in the memory 24, the values on the table is compared with the measured voltage from the sensor coil 5 or 6, then the distances ΔX, ΔY and ΔZ to the target coil 1 can be known. For example, in FIG. 13, if the voltage while the position of the sensor coil 5 or 6 moves in the order of Q1 → Q2 → Q3 is compared with the values on the table stored in the memory 24, ΔX, ΔY and ΔZ can be obtained as described above.

In the case of (2), i.e. where the target coil 1 moves freely, the technique in the case of (1) cannot be carried out. In the case of (2), the sensor coils 5 and 6 and the power coil 7 are caused to follow the target coil 1 by e.g. a motor in the directions of arrows 64 and 65. Thus, if ΔX and ΔY comes in a certain permissible range, those in the X-direction and the Y-direction are regarded as located on the center axis of the target coil 1, then the center of target coil 1 is searched while they approach the target coil 1 in the Z-direction as indicated by an arrow 66. Namely, if it is decided that the sensor coils 5 and 6 and the power coil 7 may follow the movement of the target coil 1, the former are moved gradually in the direction of the arrow 66. The water supply robot 27 shown in FIG. 15 can be realized by the technique relative to the case of (2) taking the swing of a vehicle 34 into consideration.

FIG. 15 is a perspective view of the water supply robot 27 incorporating the position detecting apparatus according to the present invention explained with reference to FIGS. 1 to 12. A water tank 35 is mounted on the body 34 of a train 33, and the tube coupler 36 which is a water supply opening connected with the water tank 35 is fixed to the body 34. Also the target coil 1 is fixed to the body 34 in the neighborhood of the tube coupler 36. The target coil 1 is connected with the capacitor 2 in the manner described above. In order that the tube coupler 37 of the robot 27 is connected with the tube coupler 36 to automatically supply water, the power coil 7 and sensor coils 5 and 6 as well as the tube coupler are fixed to the working terminal 38 of the water supply robot 27. The water supply robot 27 is composed of a truck 40 which is movable on a rail 39 provided on the ground and plural arms 41 mounted on the truck 40. The rail 39 is provided in the neighborhood of the position where the train 33 stops along the rail 42 on which the train travels.

Figure 16:
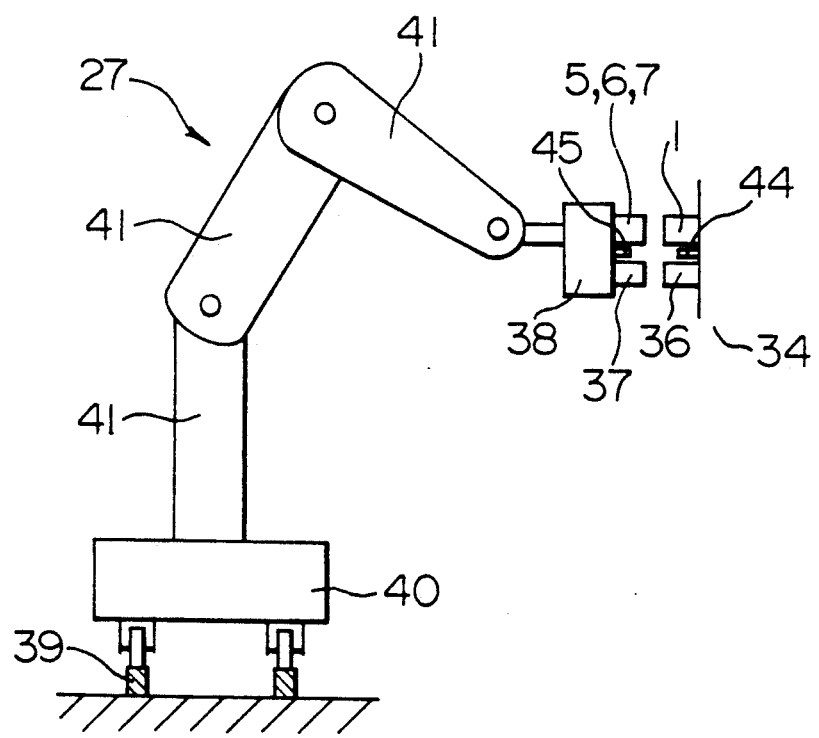
FIG. 16 is a simplified sectional view of the water supply robot with the target coil 1.

FIG. 16 is a side view of the water supply robot 27. The plurality of arms 41 and the working terminal 38 are displaced so that the relative positions of the target coil 1 and the sensor coils 5 and 6 on the X - Y plane are detected, and their shift amount in Z-direction is detected by a limit switch 45. Thus, the tube couplers 36 and 37 are connected with each other.

Figure 17:
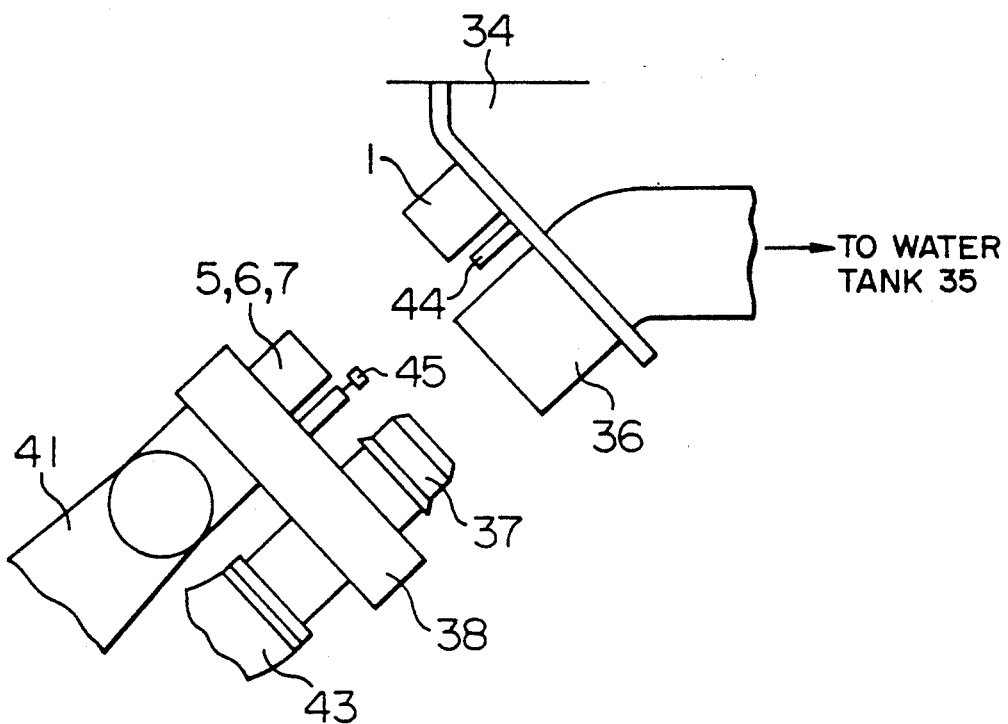
FIG. 17 is a side view of an arrangement with a tube couplers 36 and 37, coils 1, 5, 6 and 7, and limit switch 45.

FIG. 17 is an enlarged side view of the neighborhood of the tube couplers 36 and 37, and coils 1, 5, 6 and 7. The tube coupler 37 is connected with a flexible tube 43 so that water is supplied by pressure in the state where the tube couplers 36 and 37 are connected with each other. The train body is provided with a protrusion 44 to be sensed, and the working terminal 38 is provided with the limit switch 45 serving as a detecting means. When the limit switch comes into contact with the protrusion 45 in the state where the tube couplers 36 and 37 are connected with each other, the switching manner is changed so that the connecting state of the tube couplers 36 and 37 is detected. The two-dimensional positions on the X - Y plane can be sensed with the aid of the coils 1, 5, 6 and 7, and the shift amount in the Z-direction can be sensed with the aid of the protrusion and the limit switch 45.

Figure 18:
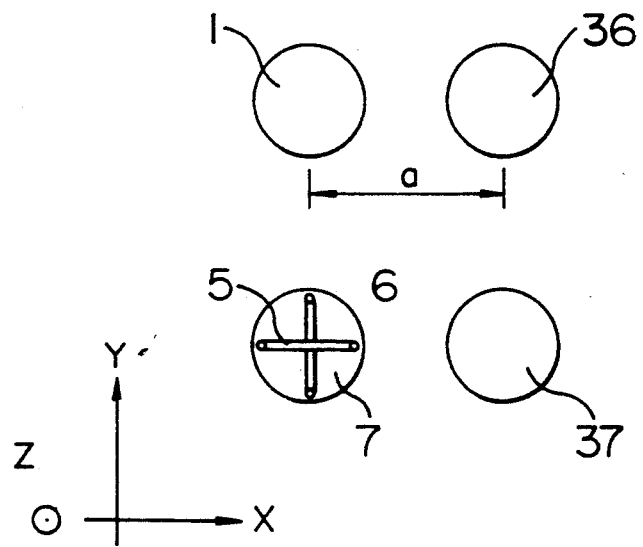
FIG. 18 is a view showing the position relationship among the tube couplers 36 and 37, and the coils 1, 5, 6 and 7.

FIG. 18 shows the relative arrangements of the tube couplers 36 and 37 and coils 1, 5, 6 and 7 in the state where the tube couplers 36 and 37 are connected with each other, the Z-axis (FIG. 1) which is the magnetic flux center line coincides with that of the power coil 7, and the center of each of the sensor coils 5 and 6 is located on the magnetic flux center line 9. Thus, in this embodiment, the distance a between the axis line of the tube coupler 36 and the magnetic flux center line of the target coil 1 is set to be equal to the distance between the tube coupler 37 and the magnetic flux center line 9 of the power coil 7.

Figure 19:
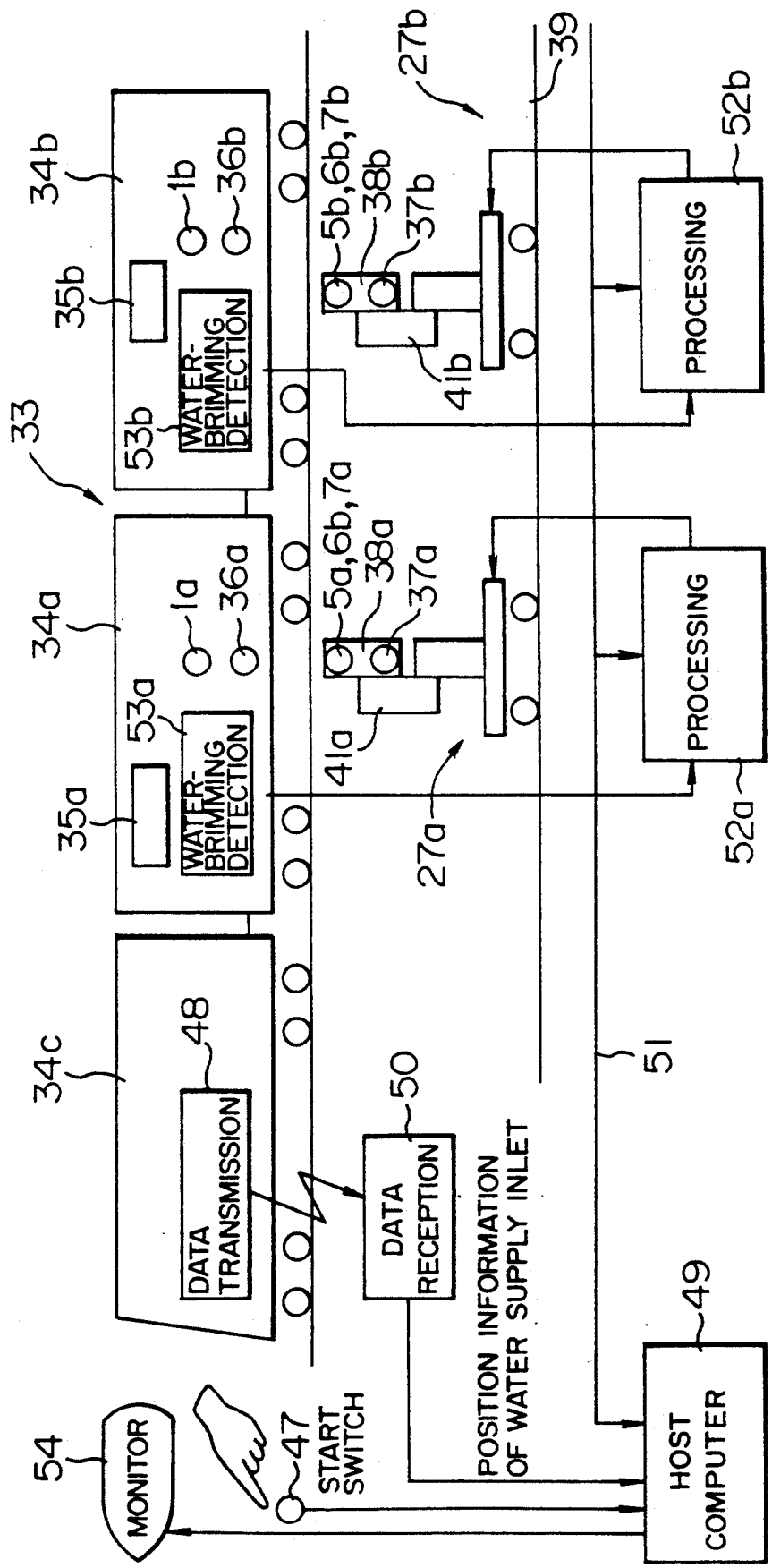
FIG. 19 is a block diagram showing the electrical construction relative to the water supply robot.

FIG. 19 is a block diagram showing the arrangement relative to a water supply robot 27. The train 34 is composed of a plurality of vehicle bodies 34a, 34b, 34c, . . . The corresponding components are designated with suffixes a, b, . . . , and the components expressed in general are designated with no suffix.

FIG. 20 is a flowchart for explaining the operation of the arrangement shown in FIG. 19. First, when the train reaches the place (e.g. a station) where the water supply robot 27 is located (step s1), an operator presses the start switch 47 (steps s2). Then, the data receiving circuit 50 connected with a host computer 49 receives the position information of the water supply inlet 36 transmitted e.g. by radio from a data transmission circuit 48 and stores it in the host computer 49 (s3). The water supply robots 27a and 27b are provided with processing circuits 52a and 52b which can be realized by computers for controlling the corresponding robots, respectively. If water tanks 35a filled to the brim with water are detected by water-brimming detecting means 53a and 53b. The detected outputs are supplied to the corresponding processing circuits 52a and 52b.

In step s4, the host computer 49 supplies the position information of the tube couplers 36a and 36b to the processing circuits 52a and 52b through a line 51. Thus, the processing circuits 52a and 52b move the water supply robots 27a and 27b along the rail 39 so that the sensor coils 5a and 5b attached to each of working terminals enter the range between P1 and P2 shown in FIG. 5B expressed relatively to the target coils 1a and 1b. The water supply robots 27a and 27b may be moved into the range between P3 and P4 in place of the range between P1 and P2.

After the water supply robots 27a and 27b are moved to the range designated by step s4, their arms 41a and 41b are moved so that the target coil 1 on the X - Y plane is sensed by the sensor coils 5 and 6 until the position P0 in FIG. 5B is located in step s5. Thus, the magnetic flux center lines of the target coils 1a and 1b coincide with the magnetic flux center line 9 of the power coil 7 so that the centers of the sensor coils 5 and 6 are located on the above magnetic flux center line 9. In step s6, the water supply robots 27a and 27b further move their arms 41a and 41b to push the tube couplers 37a and 37b for water supply into the tube couplers 36a and 36b at the water supply inlets. The connecting state of the tube couplers 36 and 37 is detected by the limit switch 45. After the tube couplers 36 and 37 have been connected, in step s7, the water supply robot 27 starts to supply water.

In step s8, the water brimming is detected by the water-brimming detecting means 53 for the water tanks 35 attached to the vehicle bodies 34a and 34b of the train 33, and this water brimming information is supplied to the processing circuit 52. Namely, it is data-transferred from the detecting means 53 through the target coil and the power coil 7 using the technique of frequency modulation.

In step s9, the water supply by the water supply robot 27 is stopped at obtaining the water-brimming information. The arms 41 is moved to disconnect the tube couplers 36 and 37 from each other. The information of completion of water supply is supplied to the host computer 49 through the processing circuit 52.

In step s10, when the host computer 49 detects that water supply from all the water supply robots 27 has been completed, it displays the completion of water supply on a monitor display means 54. The information of supplying water is also displayed on the monitor display means 54.

Finally, in step s11, the operator recognizes the completion of water supply in accordance with the displayed content on the monitor display means 54. Thus, all the operations for water supply are completed.

The present invention can be not only put into practice in relation to the water supply robot, but also applied to many other technical fields including connecting works on electronic circuit substrates such as connecting of jumper wires by a robot, automatic couplers which permits vehicle bodies to be coupled on a curve rail, detection of positions of works by a robot, non-contact limit switches, and rendezvous docking devices for space devices.

As described hitherto, in accordance with the present invention, using a target coil of a target circuit composed of the target coil and an impedance element connected with each other, the magnetic field generated owing to a power coil of an excitation coil composed of the power coil and an AC power source is detected, the magnetic field due to the target coil is sensed by a sensor coil, the output level of the sensor coil having a predetermined phase difference from the AC power source is detected by a detecting means, and so the relative position relationship between the target coil and the sensor coil can be detected corresponding to the above output level of the sensor coil. Therefore, the present invention has improved tolerance to poor environment as compared with the optical arrangement according to the prior art, and has no fear of detection impossibility and erroneous detection. Further, the target circuit requires no power source according to the present invention so that the arrangement can be simplified, and the present invention can be applied to a wide variety of technical fields.

Further, in accordance with the present invention, if a capacitor is used as the impedance connected with the target coil of the target circuit, and the resonance frequency of the target circuit is caused to be coincident with the output frequency of the AC power source, the detecting sensitivity can be improved.

In accordance with the present invention, if the a pair of sensor coils are arranged in such a manner that the magnetic flux centers of the sensor coils are orthogonal to each other, the two-dimensional position relative to the target coil can be detected.

Further, in accordance with the present invention, if the detecting means detects the output level of the sensor coil having a predetermined phase difference from the output of the AC power source, in a range between its maximum values with opposite polarities, the relative position relationship between the target coil and sensor coil linearly corresponds to the output level of the sensor coil so that the position detection can be precisely performed.

Further, in accordance with the present invention, under the condition that the target circuit is provided to a first object and the excitation circuit, the sensor coil(s) and the detecting means are provided to a second object, the first object and the second object are shifted to enter the above range, and thereafter the first and the second object are shifted so that the output level of the sensor coil having a predetermined phase difference becomes zero based on the output from the detecting means. Thus, the relative positions of the target coil and the sensor coil, that is, the positions of the first object and the second object can be detected precisely.

We claim:

1. A position detecting apparatus for detecting relative positions between a first object and a second object comprising:
    a target circuit coupled to said first object and including a target coil having two terminals and an impedance element having two terminals connected with said two terminals of the target coil respectively; and
    detection means coupled to said second object, wherein said detection means includes:
        a power coil having two terminals, the power coil being shiftable relative to the position of said target coil;
        an excitation circuit, connected with the two terminals of said power coil, supplying an AC power having zero-cross phase points for driving said power coil:
        a sensor coil arrangement attached integrally to said power coil, said sensor coil arrangement including at least a first sensor coil with a magnetic flux center line orthogonal to that of said power coil having two terminals for outputting a first output signal; and
        a sensor arrangement for sensing output signals from said sensor coil arrangement after a predetermined time interval from each of said zero-cross phase points of said AC power and for providing signals representative of said relative positions between said first and second objects, said sensor arrangement including at least a first sensing device connected with the terminals of said first sensor coil to sense the first output signal from said sensor coil arrangement.

2. A position detecting apparatus according to claim 1, wherein said impedance element is a capacitor which causes a resonance frequency of said target circuit to coincide with an output frequency of the AC power source.

3. A position detecting apparatus according to claim 1, wherein the sensor coil arrangement further includes a second sensor coil having two terminals for outputting a second output signal and having a magnetic flux center line orthogonal to the magnetic flux center lines of the first sensor coil and the power coil, and the sensor arrangement further including a second sensing device connected with the terminals of the second sensor coil.

4. A position detecting apparatus according to claim 1, wherein the phase of the first output signal has a predetermined phase difference from the zero cross phase points, and said first output signal has a measurable range where its absolute value is substantially minimum when the first sensor coil is located on the magnetic flux center line of said target coil, increases as the first sensor coil is deviated from said center line and is maximum when the first sensor coil is deviated by a predetermined amount from said center line, and said absolute value decreases when the first sensor coil is deviated from said magnetic flux center by an amount exceeding the predetermined amount.

5. A position detecting method for detecting relative positions of a first object and a second object using a position detecting device comprising a target circuit and detection means, where said target circuit comprises:
    a target coil having two terminals and a magnetic flux center; and
    an impedance element having two terminals connected with the two terminals of said target coil, and
said detection means comprises:
    a power coil having two terminals which is shiftable relatively to said target coil;
    an excitation circuit connected with the two terminals of said power coil which supplies an AC power having a fixed cycle for driving said power coil;
    at least one sensor coil having a magnetic flux center line orthogonal to that of said power coil, two terminals for outputting an output signal and attached integrally to said power coil; and
    a sensing device connected with the terminals of said sensor coil to sense the output signal from said sensor coil at a predetermined phase within the fixed cycle,
said output signal of said sensor coil having characteristic including:
    a measurable range where its absolute value is substantially minimum when the sensor coil is located on the magnetic flux center line of said target coil, and the output signal increases as the sensor coil deviates from said center line and gets maximum when the sensor coil is deviated by a predetermined amount from said center line; and
    decreasing ranges where said absolute value decreases as the sensor coil further deviates exceeding the predetermined amount from said center line,
said position detecting method comprising the steps of:
    mounting said target circuit to said first object;
    mounting said detecting means to said second object;
    roughly shifting said first object relatively to said second object based on the output signal from said sensor coil so that said output signal enters said measurable range; and
    approaching said first object relatively to said second object based on the output from said detecting means so that the absolute value of the output signal of said sensor coil gets minimum.

6. A position detecting apparatus for detecting relative positions between a first object and a second object comprising:
    an inductance modifying mechanism coupled to the first object; and
    a working terminal, coupled to said second object, including an AC power source supplying an induction current to a power coil for generating a magnetic field, the AC power source having zero-cross phase points for driving the power coil;
    a sensor coil arrangement, having a magnetic flux center line orthogonal to that of said power coil, for detecting the magnetic field, and for generating an output signal responsive to the magnetic field detected; and a sensor arrangement, coupled to the sensor coil arrangement and to the working terminal, for sensing output signals from the sensor coil arrangement after a predetermined time interval from each of said zero-cross phase points of said AC power source and for providing signals representative of said relative positions between said first and second objects.

* * * * *